US012770243B2

(12) United States Patent
Kang et al.

(10) Patent No.: US 12,770,243 B2
(45) Date of Patent: Oct. 20, 2026

(54) MODULE AND SYSTEM FOR, AND METHOD OF DETECTING DEFECTS IN ULTRA-THIN GLASS

(71) Applicant: Samsung Display Co., Ltd., Yongin-Si (KR)

(72) Inventors: Yunku Kang, Yongin-si (KR); Sungmin Park, Yongin-si (KR); Janghoon Lee, Yongin-si (KR); Leegu Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 210 days.

(21) Appl. No.: 18/750,111

(22) Filed: Jun. 21, 2024

(65) Prior Publication Data

US 2025/0022120 A1 Jan. 16, 2025

(30) Foreign Application Priority Data

Jul. 12, 2023 (KR) ........................ 10-2023-0090478

(51) Int. Cl.
*G06T 7/00* (2017.01)
*G01N 21/45* (2006.01)
(Continued)

(52) U.S. Cl.
CPC ......... *G06T 7/0008* (2013.01); *G01N 21/453* (2013.01); *G01N 21/8851* (2013.01);
(Continued)

(58) Field of Classification Search
None
See application file for complete search history.

(56) References Cited

U.S. PATENT DOCUMENTS

2014/0268105 A1 9/2014 Bills et al.
2019/0047895 A1* 2/2019 Kuhn .................... G06T 7/0004
(Continued)

FOREIGN PATENT DOCUMENTS

JP 2019-095252 A 6/2019
KR 10-2006-0034949 A 4/2006
(Continued)

OTHER PUBLICATIONS

Han-Yen Tu et al., "Digital Holographic Imaging for Optical Inspection in Learning-based Pattern Classification", Optical Measurement Systems for Industrial Inspection XI, Proc of SPIE, Jun. 21, 2019, pp. 1-11, vol. 11056, https://doi.org/10.1117/12.2525946.
(Continued)

*Primary Examiner* — Mark R Milia
(74) *Attorney, Agent, or Firm* — Innovation Counsel LLP

(57) ABSTRACT

An automatic inspection system for detecting defects in ultra-thin glass is disclosed that includes an edge inspection module for inspecting for chipping and wedge defects caused during laser cutting of the ultra-thin glass into cell units, a surface inspection module for inspecting scratches, cracks, and foreign substances on a surface of the ultra-thin glass, a phase measurement beam deflection (PMD) module for inspecting the surface of the ultra-thin glass for smudges and depressions through phase change measurement, and a Pt-derived ultra-fine defect inspection module for inspecting the ultra-thin glass for Pt-derived ultra-fine defects.

20 Claims, 14 Drawing Sheets

(51) Int. Cl.
*G01N 21/88* (2006.01)
*G01N 21/958* (2006.01)

(52) U.S. Cl.
CPC ......... *G01N 21/958* (2013.01); *G06T 7/0004* (2013.01); *G06T 2207/20084* (2013.01); *G06T 2207/30121* (2013.01)

(56) References Cited

U.S. PATENT DOCUMENTS

| | | | | |
|---|---|---|---|---|
| 2019/0294106 | A1 | 9/2019 | Cheng et al. | |
| 2022/0089872 | A1* | 3/2022 | Fukui | B05D 7/04 |
| 2022/0397935 | A1* | 12/2022 | Yoo | G06F 1/1656 |
| 2023/0042179 | A1* | 2/2023 | Lee | G01N 21/8851 |

FOREIGN PATENT DOCUMENTS

| | | | |
|---|---|---|---|
| KR | 10-1527815 | B1 | 6/2015 |
| KR | 10-2015-0077790 | A | 7/2015 |
| KR | 10-20160148339 | A | 12/2016 |
| KR | 10-20200047169 | A | 5/2020 |
| KR | 10-2021-0005975 | A | 1/2021 |
| KR | 10-2237593 | A | 4/2021 |
| KR | 10-2022-0113348 | A | 8/2022 |

OTHER PUBLICATIONS

Kwang-Beom Seo et al., "Digital holographic microscopy based on a modified lateral shearing interferometer for three-dimensional visual inspection of nanoscale defects on transparent objects", Nanoscale Research Letters, 2014, pp. 1-14, http://www.nanoscalereslett.com/content/9/1/471.

Yeh-Wei Yu et al., "Detection of Scratch on Transparent Plate with Strong Scattering Noise by Digital Holographic Technique", Crystals, Sep. 11, 2021, pp. 1-9, https://www.mdpi.com/journal/crystals, https://doi.org/10.3390/cryst11091107.

Rehima Meziane et al., "Precision inspection of transparent component quality", Research Square, Sep. 2, 2022, pp. 1-22, https://doi.org/10.21203/rs.3.rs-1997280/v1.

* cited by examiner

| item | Edge | AMO | PMD |
|---|---|---|---|
| detection item | UTG Edge Defect (Chipping, wedge) | A/A In Defect (S/C, particle) | A/A In Defect (stain, press) |
| resolution | 2.5um | 18.1um | 46um |
| representative Image |  |  |  |
| structure |   |   |   |

| compare example1 (AMO Pt particle image) | compare example2 (microscope Pt particle image) |
|---|---|
|  |  |

| microscope Image | PT Size | SVI (first) | SVI (second) | detect result |
|---|---|---|---|---|
|  | x : 3.38<br>y : 11.03 |  |  | first undetect<br>second detect sample |
|  | x : 3.60<br>y : 2.33 |  |  | first undetect<br>second undetect |
|  | x : 2.98<br>y : 7.88 |  |  | first undetect<br>second detect sample |
|  | x : 4.50<br>y : 4.50 |  |  | first undetect<br>second detect sample |
|  | x : 4.28<br>y : 4.50 |  |  | first detect<br>second detect |

FIG. 8A

| item | Area Line Scan - 2D | microscope - 2D | Holography - 3D |
|---|---|---|---|
| Pixel resolution (μm) | 18.1 | 0.225 | 1 (depends on lens magnification) |
| μm Pt visibility | invisible | visible | visible (Pt nucleus / Moire) |
| imaging Image | 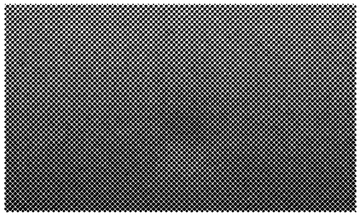 | 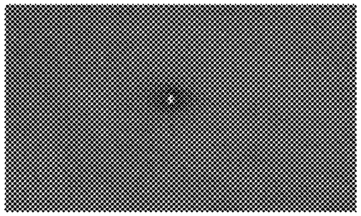 | 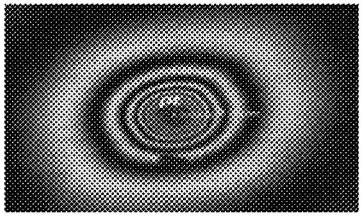 |
| imaging method | Area + Line Scan method | Line Scan | Holography + Line Scan method |
| vibration | △ (stone tablet) | ○ (require anti-vibration component) | ◎ |
| depth | △ | △ (2.43μm / Auto Focus required) | ◎ |
| light | X (require multiple light) | △ (require high intensity lighting) | ◎ (no lighting required) |
| note | 50μm less than potential bad leakage Y | vibration / Data storage weakness | PT optimize Pt particle detection (1~50μm) |

| magnificaion | 2X | 5X | 10X | 20X |
|---|---|---|---|---|
| Image |  |  |  |  |
| expectation FOV | 10mm | 4mm | 2mm | 1mm |
| expectation cone shape stamping | 5.1sec (2 scan) | 27.3sec (5 scan) | 105.8sec (10 scan) | 436.8sec (20 scan) |

MODULE AND SYSTEM FOR, AND METHOD OF DETECTING DEFECTS IN ULTRA-THIN GLASS

CROSS-REFERENCE TO RELATED APPLICATION

This application claims priority to and the benefit of Korean Patent Application No. 10-2023-0090478 filed at the Korean Intellectual Property Office on Jul. 12, 2023, the entire contents of which are incorporated herein by reference.

BACKGROUND

(a) Field of the Disclosure

The present disclosure relates to a module and system for, and a method of automatically detecting Pt-derived ultra-fine defects in ultra-thin glass.

(b) Description of the Related Art

Along with the recent increase in demand for smartphones, a new growth industry for electronic products related to flexible displays is in full swing.

In order to manufacture a flexible display, ultra-thin glass (referred to as UTG in the drawings) is used.

At this time, ultra-thin glass refers to tempered glass having a thickness of 100 micrometers or less, and because it is very thin, it is not broken even if it is folded or bent compared to ordinary glass.

Such ultra-thin glass is not only difficult to manufacture compared to general tempered glass, but also has a high defect rate, so companies in this field are expanding their efforts to stabilize the manufacturing process, reduce the defect rate, and reduce labor costs.

In particular, in order to guarantee the quality of ultra-thin glass, an inspection system must be used to inspect the surface state—for example, whether bubbles, foreign substances, cracks, chipping, etc. have occurred.

However, despite passing through such an inspection system, as stated in FIG. 1A, cracks occurred in the shipped ultra-thin glass (abbreviated as UTG in the drawings), and a detailed analysis of the cause revealed that the cracks originated from ultra-fine 1 to 50 μm Pt (Platinum) impurities in the ultra-thin glass, it was found that when the ultra-thin glass is folded or bent, folding stress is applied, causing the cracks to grow and damage the surface of the ultra-thin glass.

As shown in FIG. 1B, the ultra-fine Pt foreign material, which was not detected in the conventional glass inspection automatic machine vision system, is a pipe material in which the glass melt at a high temperature of 1600° C. moves from the furnace to the injection nozzle when processing the current ultra-thin glass ledger. Pt (melting point of 1700° C. or more), which has excellent wear resistance, is used, ultra-fine foreign matter is oxidized inside the pipe to grow and precipitate as ultra-fine Pt crystals, or oxygen to form needle-shaped bubbles.

Ultra-thin glass has a very complicated manufacturing process compared to general tempered glass, as shown in FIG. 1B, formed, 10 glass ledgers are roll laminated, and when the resin layer is UV cured, it is cut and chamfered in cell units, and edge healing is performed to improve chamfered edge defects, and UV curing is performed to reduce the adhesive strength of the resin layer, after peeling, dumping into a cassette and cleaning, 1st full surface healing, dumping before reinforcement, reinforcement, dumping after reinforcement after changing the cassette, washing after reinforcement, automatic inspection after 2nd full surface healing, cell by cell, sampling among cells and folding inspection, film after removal and cleaning, protective films are attached to the top and bottom of the cell unit, edge inspection is performed again, vacuum packaging is performed in tray units, wire banding is performed for vinyl packaging, and packaging shipment in box units is complicated and difficult, as well as defective rate, so efforts are being made to stabilize the manufacturing process, reduce defect rates, and reduce labor costs.

In particular, in order to guarantee the quality of the ultra-thin glass, a thorough automatic inspection is performed for appearance defects such as foreign material scratches, edges, and depressions on the surface of the ultra-thin glass cell unit.

However, the current automatic inspection for external defects in ultra-thin glass have been developed considering a foreign matter detection limit of initially 150 μm or more, and the optical system design and detection methods etc., so ultra-fine foreign substances of 1 to 50 μm or less are not detected, leading to a problem where ultra-thin glass is shipped.

In order to solve this problem, an attempt was made to modify the ultra-fine Pt foreign material detection limit to 1 μm or more, but there is still a problem in that it is not possible to set the conditions for detecting ultra-fine Pt foreign materials of 1 to 50 μm or less due to the detection limit of the optical system.

In particular, with the current automatic glass inspection system, in order to inspect the surface state of ultra-thin glass—for example, whether bubbles, foreign substances, cracks, or chipping have occurred—the central part is bent by its own weight, and in order to prevent deformation, the edge must be tension-fixed. In this case, wrinkles are formed on the top, bottom, left, and right sides, resulting in poor inspection accuracy, or slipping or breaking due to the nature of the ultra-thin glass material.

SUMMARY

Embodiments of the present disclosure may provide a module and system for, and a method of automatically inspecting ultra-fine glass for ultra-fine Pt foreign substances of 1 to 50 μm inside the ultra-thin glass, which is a cause of breakage during tension of the ultra-thin glass.

An embodiment of an automatic inspection system for detecting defects in ultra-thin glass includes an edge inspection module that inspects for chipping and wedge defects caused during laser cutting of the ultra-thin glass into cell units; a surface inspection module for inspecting scratches, cracks, and foreign substances on a surface of the ultra-thin glass, a phase measurement beam deflection (PMD) module for inspecting the surface of the ultra-thin glass for stains and depressions through phase change measurement, and a Pt-derived ultra-fine defect inspection module for inspecting the ultra-fine glass for Pt-derived ultra-fine defects.

The Pt-derived ultra-fine defect inspection module may include a holographic restoration device, a scanning device that moves the holographic restoration device along a predetermined scan path, and an ultra-fine defect determination device that determines the Pt-derived ultra-fine defects using a unique moiré pattern of an image obtained from the holographic restoration device.

An embodiment of an automatic detection module for detecting ultra-fine defects in ultra-thin glass includes a holographic restoration device, a scanning device for moving the holographic restoration device along a predetermined scan path, and an ultra-fine defect determination device that determines Pt-derived ultra-fine defects using a unique moiré pattern of an image obtained from holographic restoration device.

A control device may the magnification of a hybrid objective lens to be a low magnification of 2×, and the scanning device may have a scan speed of 2 to 5 seconds per scan and a field of view (FOV) of 10 mm when scanning a 10 mm area of the ultra-thin glass.

The ultra-fine defect determination device may include an image acquisition unit that acquires a Pt-derived ultra-micro defect moiré intrinsic characteristic image captured on the ultra-thin glass and stores it in an image storage device, and the captured image obtained from the image acquisition unit is a Pt-derived ultra-fine defect determination unit for determining the presence or absence of the Pt-derived ultra-fine defect based on the inference result output from the Pt-derived ultra-fine defect determination model by inputting the input to the determination model, and it is characterized in that it includes a machine learning unit for learning the unique characteristics of the moiré pattern of the defect.

An embodiment of a a method of automatically inspecting ultra-thin glass for Pt-derived ultra-fine defects includes inspecting a predetermined surface area of the ultra-thin glass for scratches, foreign matter, dents, and stains when the cassette is loaded into the automatic inspection system for poor appearance of the ultra-thin glass in units of cells, performing a Pt-derived ultra-fine defect inspection on the ultra-thin glass using a holographic restoration device and a scanning device that moves the holographic restoration device along a predetermined scan path, performing edge defect detection for detecting edge defects on the ultra-thin glass on a cell-by-cell basis or inspecting surface stains or depressions of the ultra-thin glass through phase change measurement; and inspecting the ultra-thin glass by bending or folding the ultra-thin glass in units of cells.

An embodiment of a method for inspecting ultra-fine glass for Pt-derived ultra-fine includes bringing the ultra-thin glass into the inspection module, scanning a first line with respect to a dummy formed at one end of the ultra-thin glass with a holographic restoration device, determining a unit area (UA) that can be photographed at one time by the holographic restoration device and resolution, depth, speed, and tact time of the holographic restoration device based on a measurement value obtained through a first line scan of the dummy, determining and controlling a predetermined scan path of the scanning device, an objective lens magnification and a tact time of the holographic restoration device, determining the number of effective areas for the entire area of the ultra-thin glass according to a predetermined scanning path of the scanning device and scanning the second to Nth lines, restoring the shape of the entire ultra-thin glass by storing partial images of the ultra-thin glass through scanning of the second to Nth lines in the image sensor, determining a 2D Pt-derived defect-specific moiré pattern image on the restored 3D glass shape using a deep learning algorithm, and recognizing the nucleus of the Pt foreign material by magnifying the unique pattern of the Pt-derived defect.

According to the automatic detection module and method for Pt-derived ultra-fine defects in ultra-thin glass according to an embodiment of the present disclosure, and the automatic appearance defect inspection system and method for ultra-thin glass using the same, a method for inspecting Pt-derived ultra-fine defects in ultra-thin glass (by using "Ultra-Fine Defect Inspection" UDI in the drawing), the need to stretch and then un-stretch the edges of the ultra-thin glass may be eliminated.

BRIEF DESCRIPTION OF THE DRAWINGS

FIGS. 7A, 7B, 7C, 8A, and 8B are diagrams for explaining the effects of an automatic inspection system and inspection method for appearance defects of ultra-thin glass according to an embodiment of the present disclosure compared with comparative examples.

DETAILED DESCRIPTION OF THE EMBODIMENTS

Figure 1A:
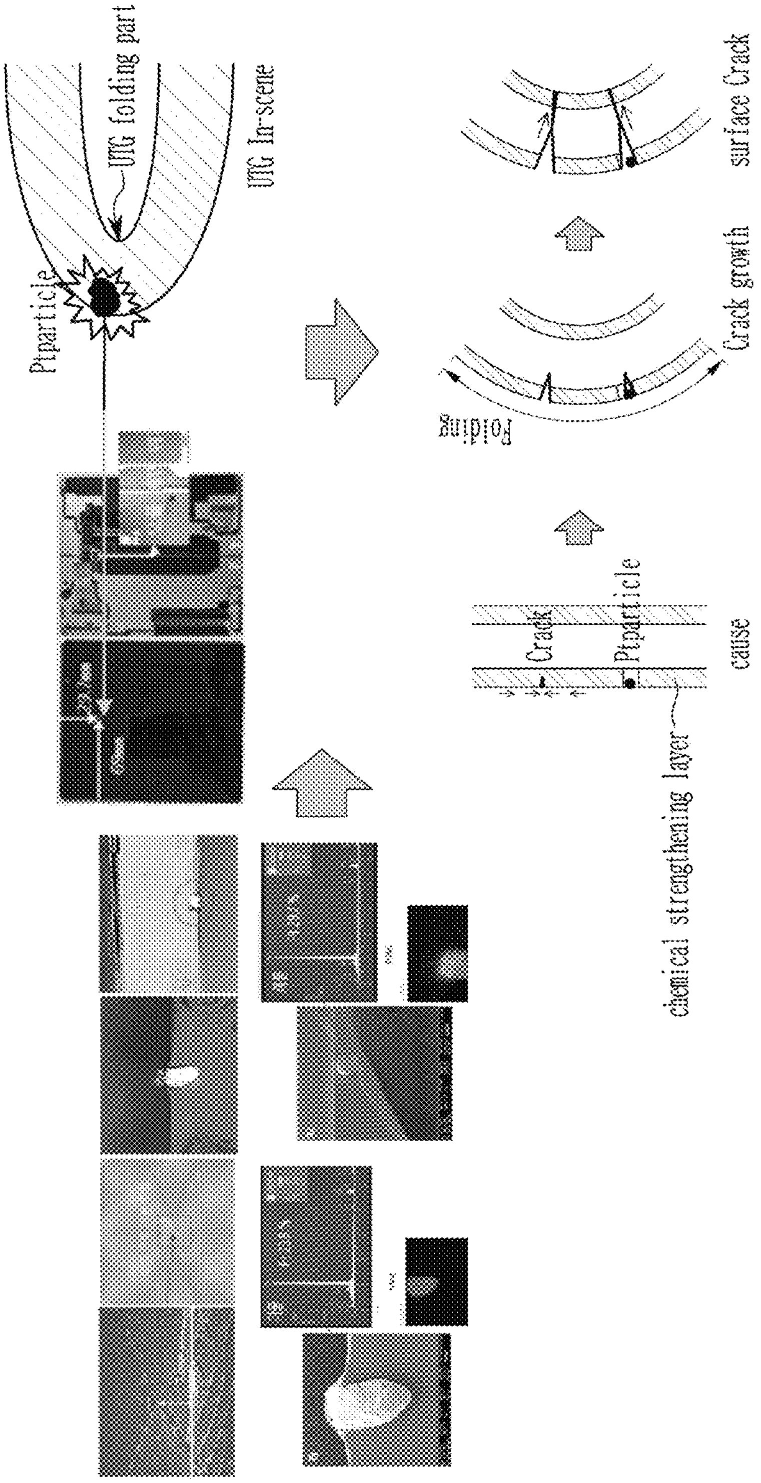
FIG. 1A is a view explaining a mechanism in which surface breakage occurs when a conventionally shipped ultra-thin glass is tensioned.
Figure 1B:
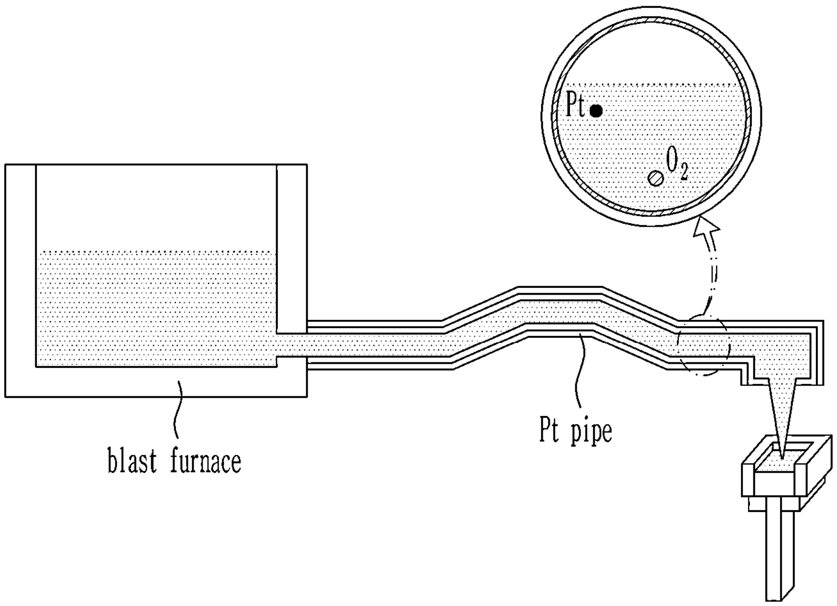
FIG. 1B is a view explaining the origin of ultra-fine Pt foreign matter that causes surface breakage during tension of conventionally shipped ultra-thin glass.

Hereinafter, a machine vision system and method for automatically detecting ultra-micro defects in ultra-thin glass according to an embodiment of the present disclosure will be described in detail with reference to the accompanying drawings.

Hereinafter, the same reference numerals are used for technical elements that perform the same functions, and repeated detailed descriptions are omitted to avoid redundant description.

In addition, the embodiments described below are shown by way of example to effectively show preferred embodiments of the present disclosure, and should not be construed to limit the scope of the present disclosure.

Figure 2:
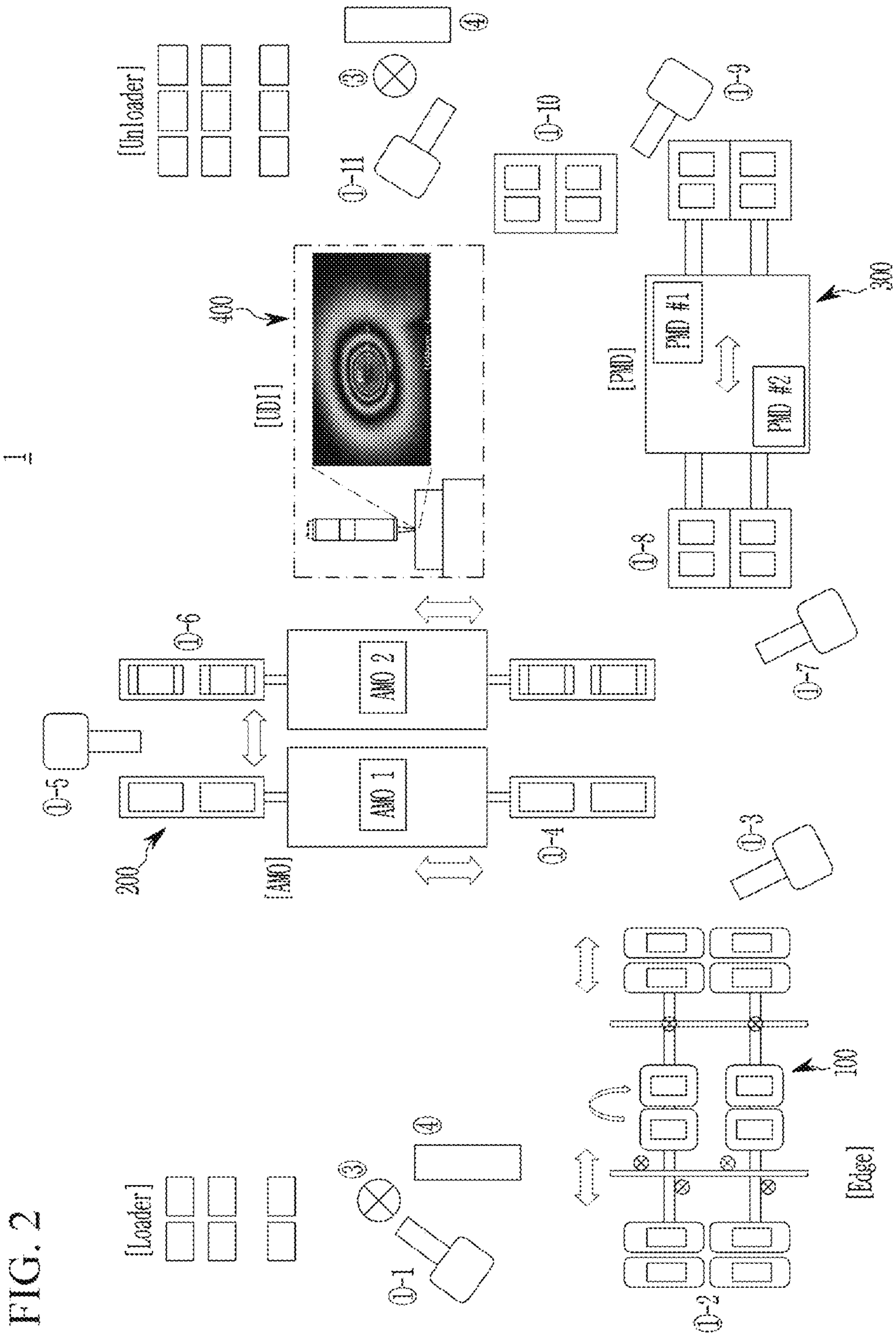
FIG. 2 is a view showing an automatic inspection system for defective appearance of ultra-thin glass according to an embodiment of the present disclosure.
Figure 3A:
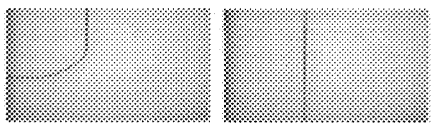
FIG. 3A is a view showing the configuration and characteristics of an optical system of an edge inspection module, a surface inspection module, and a phase measurement beam deflection module of an automatic inspection system for defective appearance of ultra-thin glass according to an embodiment of the present disclosure.
Figure 3A:
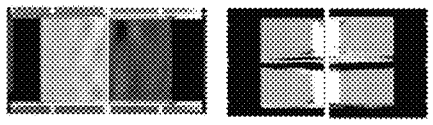
Figure 3A:
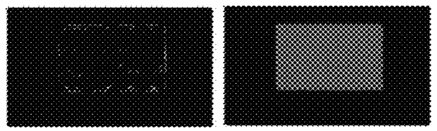
Figure 3A:
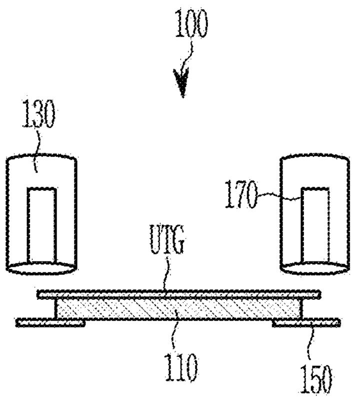
Figure 3A:
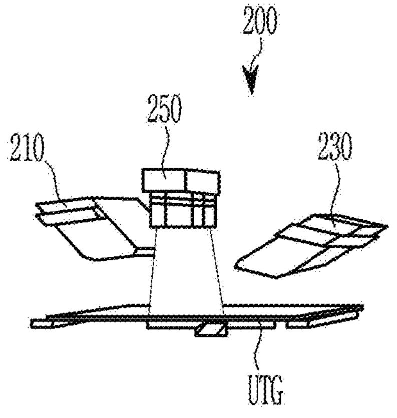
Figure 3A:
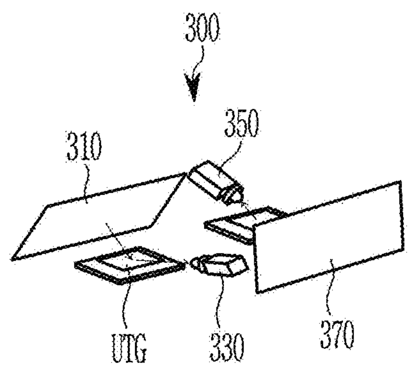
Figure 3B:
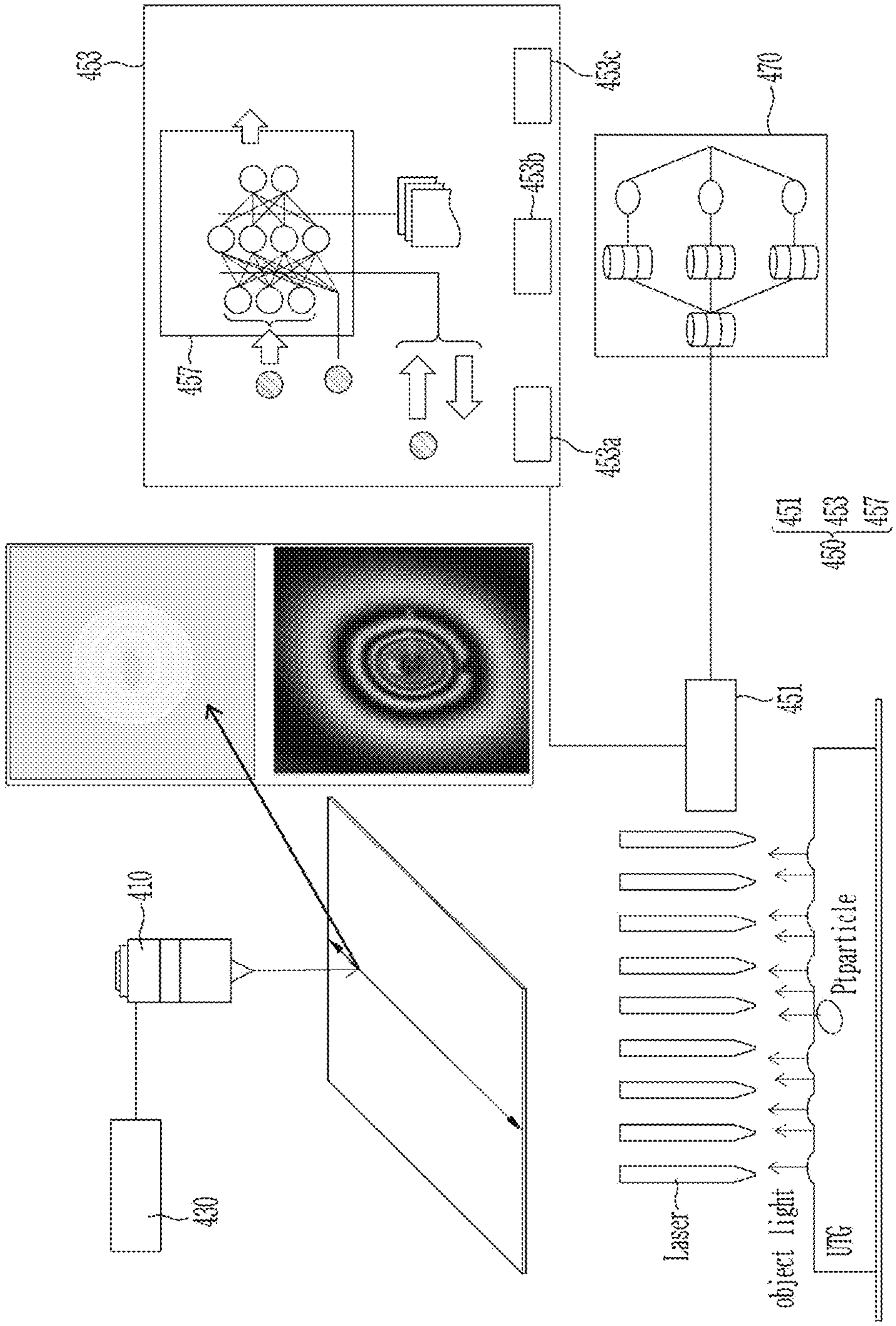
FIG. 3B is a view showing the configuration and characteristics of the optical system of the Pt-derived ultra-fine defect inspection module of the automatic appearance defect inspection system for ultra-thin glass according to an embodiment of the present disclosure.

FIG. 2 is a diagram illustrating an ultra-thin glass appearance defect automatic inspection system according to an embodiment of the present disclosure, FIG. 3A is a diagram illustrating the optical system configuration and characteristics of the edge inspection module, surface inspection module, and phase measurement light bias module of the ultra-thin glass appearance defect automatic inspection system according to an embodiment of the present disclosure, and FIG. 3B is a diagram illustrating the optical system configuration and characteristics of the Pt-derived ultra-fine defect inspection module of the ultra-thin glass appearance defect automatic inspection system according to an embodiment of the present disclosure.

The ultra-thin glass appearance defect automatic inspection system 1 according to an embodiment of the present disclosure may include an edge inspection module 100 that inspects defects such as chipping or wedges, such as micro-cutting chips, during physical cutting using a laser with femtosecond or other pulse width on a cell unit basis of ultra-thin glass, a surface inspection module (200; area measuring optics) that inspects scratches, cracks, or foreign substances on the surface of the ultra-thin glass, a phase measurement light deflection module (300; PMD: phase measuring deflectometry) that inspects stains or depressions on the surface of the ultra-thin glass by measuring phase changes, and a Pt-derived ultra-fine defect inspection module 400 that inspects ultra-fine Pt defects originated from the oxidation of the inside of the Pt pipe used in the injection molding of the ultra-thin mother glass, growth into ultra-fine Pt crystals, precipitation, or oxygen generated at this time forming needle-shaped bubbles.

As shown in FIG. 3A, since the edge inspection module 100 has a problem in that one sheet of ultra-thin glass is too thin and is damaged during the inspection step, the edge portion of the ultra-thin glass cell is measured in units of cells for several sheets of ultra-thin glass, a UVW alignment stage 110 supported at the lower part of the ultra-thin glass cell to be exposed, at least two lights 130 arranged to illuminate the upper edge of the ultra-thin glass cell, and the at least two lights 130, a mirror 150 disposed under the edge portion of the ultra-thin glass cell to reflect light passing through the edge portion of the ultra-thin glass cell and an image of the edge portion of the ultra-thin glass cell reflected through the mirror 150 may be obtained, an optical system 170 is disposed above the edge portion of the ultra-thin glass cell arranged so as to be included.

The edge inspection module 100 should be designed to have at least two illuminations 130 and an optical system 170 corresponding to the edge of the ultra-thin glass cell, with a resolution of 2.5 um; however, there is a problem of being vulnerable to vibrations because it uses a UVW alignment stage 110.

The surface inspection module 200 uses lights that work together to identify defects (e.g., scratches, foreign matter, bubbles, cracks) on the surface of the ultra-thin glass or inside the body, such as a strobe light and analog including a camera, the strobe light 210 emits light for dimming a part of the ultra-thin glass, and an analog camera 230 positioned on the other side of the ultra-thin glass takes a picture of the dimmed part of the ultra-thin glass, and it may include a photo analysis unit 250 that analyzes a photo to determine what kind of defect exists in a portion of the ultra-thin glass.

The above strobe light (210) emits light that illuminates a wide area, so it is excellent in terms of speed, but there is a problem in that the resolution of the above analog camera 230 is 18.1 um, so things that are not defects such as dust are judged as defects by the above photo analysis part 250, resulting in decreased accuracy.

In addition, the phase measuring beam deflection module 300 may include a screen 310 that phase-shifts a predefined pattern light and outputs it to ultra-thin glass based on the principle that a pattern reflected from a sample is affected by a surface shape, and a camera 330 that measures light reflected from glass, a shape measurement unit 350 that generates surface shape information of the ultra-thin glass based on the measured reflected light, and a surface of the ultra-thin glass using a phase measurement beam deflection method, and a surface inspection unit 370 for measuring the shape may be included.

The phase measurement beam deflection module 300 forms a 3D image, and has a resolution of 46 μm, which is higher in defect detection accuracy than the surface inspection module 200, so that defects such as stains and depressions, which are particularly problematic in ultra-thin glass, can be detected; however, the surface inspection unit 370 has a problem in that it cannot inspect Pt-derived ultra-fine defects.

As shown in FIG. 3B, the automatic appearance defect inspection system 1 of ultra-thin glass according to an embodiment of the present disclosure may include the edge inspection module 100, the surface inspection module 200, and the phase measurement deflection inspection module; it is characterized in that it may include a Pt-derived ultra-fine defect detection module 400 for inspecting Pt-derived ultra-fine defects of 1 to 50 μm or less that could not be detected depending on the optical system or inspection environment through 300.

The ultra-thin glass exterior defect automatic inspection system 1 according to an embodiment of the present disclosure uses the moiré defect unique characteristics, which are rarely used in transparent ultra-thin glass where scattering does not occur well on the surface, in its Pt-derived ultra-fine defect detection module 400.

In general, the moiré interference method is often used for objects that scatter well on the surface or have opaque material characteristics.

The above-mentioned Pt-derived ultra-fine defect detection module 400 may include a holographic restoration device 410 and a scanning device 430 that moves the holographic restoration device 410 along a predetermined scanning path, and an ultra-fine defect judgment device 450 that judges Pt-derived ultra-fine defects using the unique moiré pattern of Pt-derived ultra-fine defects appearing in the hologram image restored from the holographic restoration device 410.

Table 1 shows the results for the case of varying the magnification of the objective lens 419, which describes the tact time (system logistic time) of the scanning process of the scanning device 430 below.

It can be seen that the scanning device 430 can obtain a field of view (FOV) of 10 mm for 2.4 seconds per scan when scanning a 10 mm area of the folding portion of the ultra-thin glass when a low magnification of 2× is applied, thereby achieving mass productivity.

TABLE 1

A table showing the tact time of the scanning process of the scanning device 430:

| | | Magnification | | | |
|---|---|---|---|---|---|
| Scan Area | Item | 20× | 10× | 5× | 2× |
| 5 mm × 160 mm | Total Scan Line | 5 | 3 | 2 | 1 |
| | FOV | 1 | 2 | 4 | 10 |
| | Optical Resolution (um) | 0.7 | 1 | 2 | 5 |
| | Pixel Resolution (um) | 0.5 | 1 | 2 | 5 |

TABLE 1-continued

A table showing the tact time of the scanning process of the scanning device 430:

| Scan Area | Item | Magnification | | | |
|---|---|---|---|---|---|
| | | 20× | 10× | 5× | 2× |
| | Depth of Focus (um) | 160 | 350 | 1,400 | 9,100 |
| | JPEG Image capacity (MB)_average | 1,394 | 418 | 139 | 28 |
| | Stage Speed (mm/s) | 11.2 | 16 | 32 | 80 |
| | Scan Tact Time(s) | 74.8 | 31.6 | 10.8 | 2.4 |
| 10 mm × 160 mm | Total Scan Line | 10 | 5 | 3 | 1 |
| | FOV | 1 | 2 | 4 | 10 |
| | Optical Resolution (um) | 0.7 | 1 | 2 | 5 |
| | Pixel Resolution (um) | 0.5 | 1 | 2 | 5 |
| | Depth of Focus (um) | 160 | 350 | 1,400 | 9,100 |
| | JPEG Image capacity (MB)_average | 2,788 | 697 | 209 | 28 |
| | Stage Speed (mm/s) | 11.2 | 16 | 32 | 80 |
| | Scan Tact Time (s) | 149.8 | 52.8 | 16.3 | 2.4 |
| 20 mm × 160 mm | Total Scan Line | 20 | 10 | 5 | 2 |
| | FOV | 1 | 2 | 4 | 10 |
| | Optical Resolution (um) | 0.7 | 1 | 2 | 5 |
| | Pixel Resolution (um) | 0.5 | 1 | 2 | 5 |
| | Depth of Focus (um) | 160 | 350 | 1,400 | 9100 |
| | JPEG Image capacity (MB)_average | 5,576 | 1,394 | 349 | 56 |
| | Stage Speed (mm/s) | 11.2 | 16 | 32 | 80 |
| | Scan Tact Time (s) | 299.8 | 105.8 | 27.3 | 5.1 |

The ultra-fine defect determination device 450 may include an image acquisition unit 451, a Pt-derived ultra-fine defect determination unit 453, and a machine learning unit 457, the image acquisition unit 451 is formed on ultra-thin glass, and the captured Pt-derived ultra-fine moiré-specific characteristic image may be acquired, classified and stored in the image storage device 470.

The Pt-derived ultra-fine defect determination unit 453 inputs the captured image acquired from the image acquisition unit 451 to the Pt-derived ultra-fine defect determination model 453*a*, and the inference output from the Pt-derived ultra-fine defect determination model 453*a* based on the result, and the presence or absence of a defect is determined.

The Pt-derived micro-defect determination model 453*a* is a model learned by the machine learning unit 457 for the intrinsic characteristics of the moiré pattern of Pt-derived ultra-micro defects of the ultra-thin glass.

The Pt-derived ultra-fine defect determination model 453*a* maps the intrinsic characteristics of the moiré pattern of Pt-derived ultra-fine defects of ultra-thin glass, such as interference fringes, distance from the nucleus, and the period of blurring of light and shade of wavy patterns as correct data, and it can be constructed by machine learning of the machine learning unit 457 using teacher data.

In addition, since the Pt-derived ultra-fine defect determination unit 453 knows that a unique moiré pattern is formed for Pt-derived or Pt-caused ultra-fine defects—for example, Pt foreign materials or needles, oxygen, bubble defects and Pt foreign material defects (e.g., crystals from refractories, precipitation, etc.), Pt-derived ultra-fine defect type determination model 453*b* and oxygen, bubble defects and Pt foreign material defects size determination model 453*c* through a unique moiré pattern—it can be constructed by machine learning of the machine learning unit 457 using teacher data in which interference fringes, distance from the nucleus, period of blurring of light and shade of moiré patterns, etc. are mapped as correct answer data.

Figure 4:
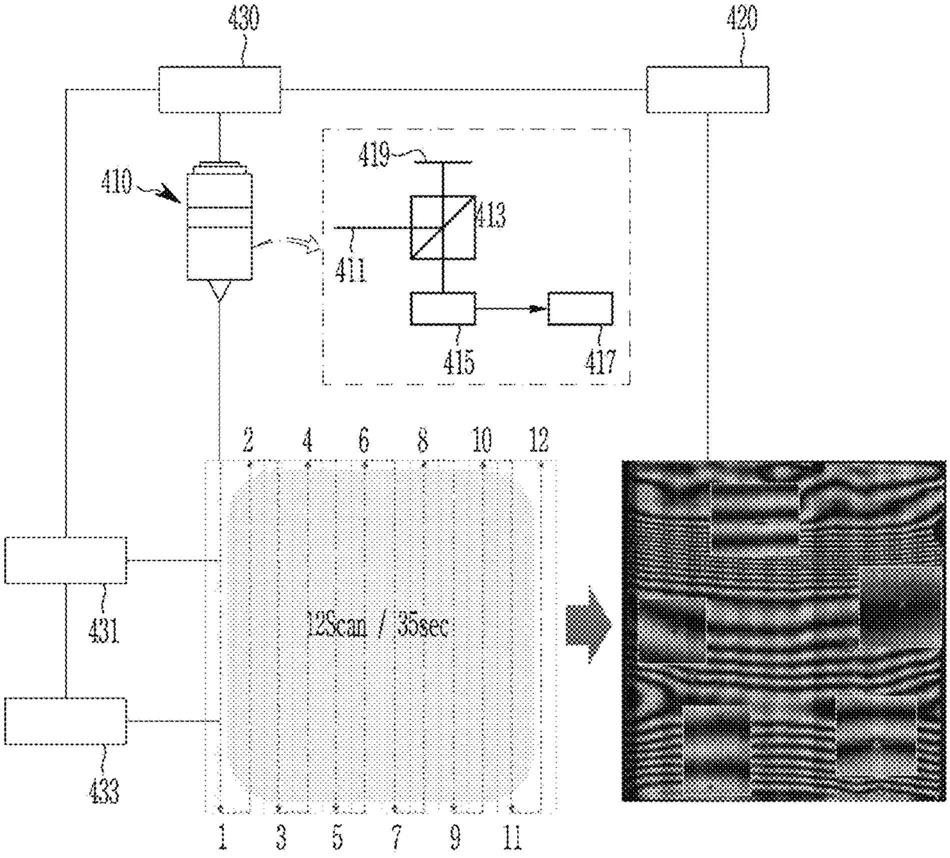
FIG. 4 is a diagram showing a detailed configuration of a Pt-derived ultra-fine defect inspection module for ultra-thin glass according to an embodiment of the present disclosure.

As shown in FIG. 4, the holographic restoration device 410 uses a laser 411 that generates light of a single wavelength as a light source, and uses a beam splitter 413 to generate light generated by the laser 411; in this case, one light (hereinafter referred to as reference light) is directed toward the image sensor 415, and the other light (hereinafter referred to as object light) is reflected from the ultra-thin glass and is reflected from the image sensor (415) so that interference between reference light and object light occurs.

The image sensor 415 records the interference pattern according to the interference phenomenon as a digital image, and the 3D shape restoration unit 417 can restore the 3D shape of the object to be measured from the recorded interference pattern.

Generally, as a surface inspection device for ultra-thin glass, due to the material characteristics of ultra-thin glass, scattering does not easily occur on the surface and it is transparent, so the moiré method is not used; however, it utilizes the point where the Pt foreign matter in the ultra-thin glass interferes with or diffracts the femtosecond laser light.

The holographic restoration device 410 may inspect the surface of the ultra-thin glass M corresponding to the unit area UA with a single measurement.

Here, the unit area UA has a rectangular shape, and the size of the unit area UA may be x mm by y mm.

For example, the size of the unit area UA may be 10 (±5 mm) mm by 160 mm.

However, this is only one embodiment, and the technical spirit of the present disclosure is not limited thereto.

The unit area UA may accurately divide the surface of the ultra-thin glass M having a constant area in the x-y plane direction into n by m pieces (n and m are integers).

However, since the unit area UA corresponds to the ability of the holographic reconstruction device 410 to take pictures at one time, it may not correspond to the area of the holographic reconstruction device 410 by an integer multiple.

The above-mentioned scanning device 430, as described above, has a unit area (UA) that the holographic restoration device 410 can shoot at once, and it cannot inspect the entire area of the ultra-thin glass, this problem can be solved by the holographic restoration device 410 moving +y mm after scanning, moving x mm along a section of the ultra-thin glass, then moving −y mm again, and moving x mm in a zigzag pattern along the opposite section.

The image obtained by the aforementioned holographic restoration device 410 may generate noise in areas adjacent to the edges due to the interference of the laser, so by overlapping some of the unit areas (UA) and scanning, the entire surface of the ultra-thin glass can be inspected.

In the present disclosure, even if an image is acquired for the unit area (UA), since the effective area for obtaining 3D shape information may be smaller than the unit area (UA), the area of the effective area and the area of the ultra-thin glass are using this, the effective scan path of the scanning device 430 may be determined in a zigzag form to overlap in consideration of noise.

The Pt-derived ultra-fine defect inspection module 400 takes an image of the first unit area UA corresponding to the end of the ultra-thin glass and then interlocks with the dummy sensors 431 and 433 (i.e., speed and speed-dependent resolution measurement) to detect the control device 420 which may include the magnification of the hybrid objective lens 419 for two unit areas UA, the speed of the scanning device 430, and the effective scanning path.

Pt nuclei can be recognized by enlarging a portion where a moiré-specific pattern is formed by the hybrid objective lens 419.

Now, with reference to FIGS. 5 and 6, a method for automatically inspecting the appearance of ultra-thin glass according to an embodiment of the present disclosure and a method for inspecting ultra-fine defects derived from Pt of the ultra-thin glass according to an embodiment of the present disclosure will be described.

Figure 5:
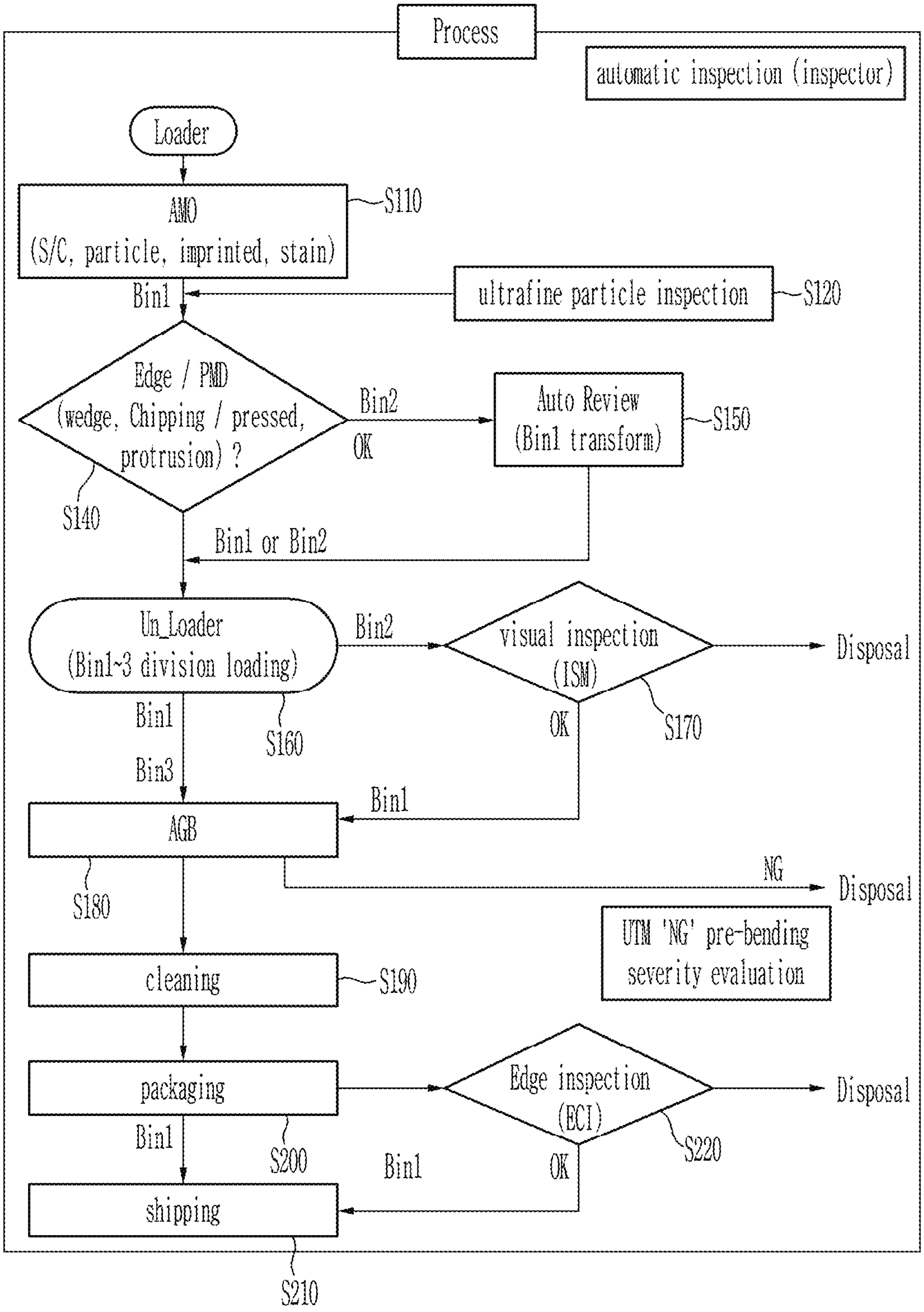
FIG. 5 is a flowchart showing a method for automatically inspecting the appearance of ultra-thin glass according to an embodiment of the present disclosure.
Figure 6:
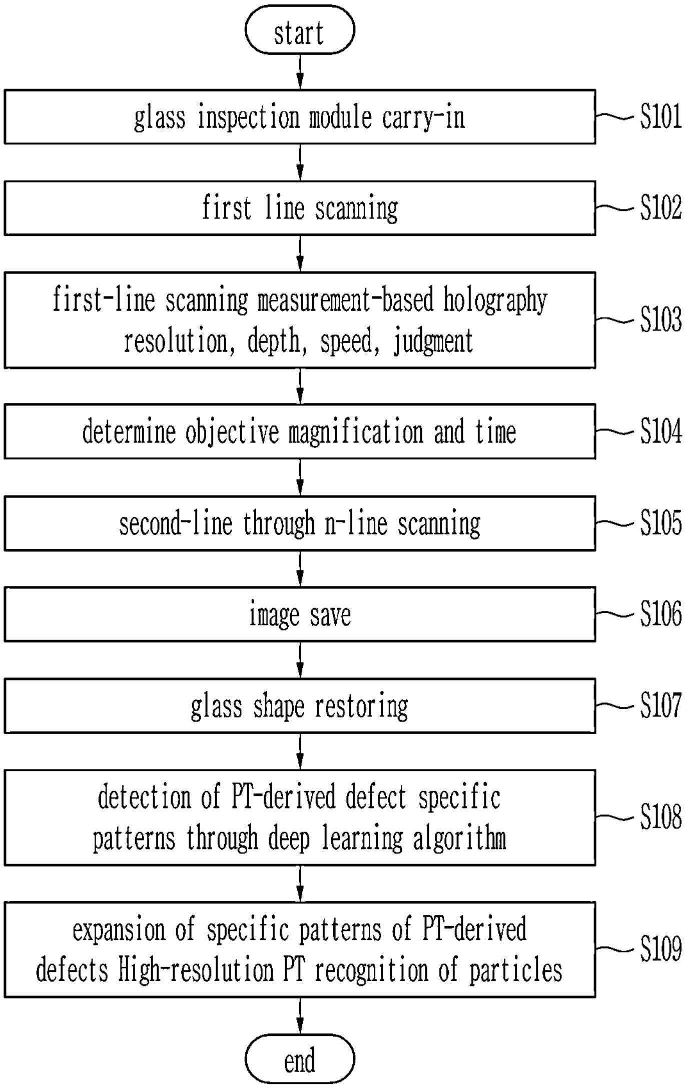
FIG. 6 is a flowchart showing a method of inspecting Pt-derived ultra-fine defects in ultra-thin glass according to an embodiment of the present disclosure.

FIG. 5 is a flowchart illustrating a method for automatically inspecting the appearance of ultra-thin glass according to an embodiment of the present disclosure, and FIG. 6 is a flowchart illustrating a method for inspecting ultra-fine defects derived from Pt in ultra-thin glass according to an embodiment of the present disclosure.

As shown in FIG. 5, in the method for automatically inspecting the appearance of ultra-thin glass according to an embodiment of the present disclosure, when the cassette is loaded into the automatic inspection system for appearance of defective ultra-thin glass in units of cells, the ultra-thin glass is supplied horizontally from the cassette a surface appearance (AMO) inspection step, which is less accurate but can be quickly detected, is performed on a predetermined area of the ultra-thin glass to inspect scratches, foreign matter, nicks, and stains (S110).

In the method for automatically inspecting the exterior of the ultra-thin glass according to an embodiment of the present disclosure, the ultra-thin glass is inspected for ultra-fine defects derived from Pt using the holographic restoration device 410 and the scanning device 430 (S120).

For Bin 1 that has passed the surface appearance inspection and the Pt-derived ultra-fine defect inspection, the edge inspection module 110 detects edge defects such as wedging or chipping in several cell units of ultra-thin glass edge defect detection. Alternatively, the surface of the ultra-thin glass may be stained or pressed in the phase measurement beam deflection module 300 by measuring a phase change (S140).

In the case where there is a wedge, chipping, pressing or protrusion in the edge defect inspection or the phase measurement ray deflection inspection, automatic review (auto review) is performed in Bin 2 (S150).

The automatic review step (S150) is to prevent the disposal of the ultra-thin glass, which may occur due to dust or unstable inspection equipment, since the ultra-thin glass is manufactured through a very difficult and complicated process.

In the case where edge defects such as wedge or chipping of the ultra-thin glass cell are detected in the edge inspection module 100, or scratches, foreign substances, dents, and stains are inspected in the PMD inspection, automatic review is performed through Bin 2, and Bin 1 again, alternatively, it is loaded separately into Bin 2.

When the ultra-thin glass is unloaded from the automatic appearance defect inspection system 400 through the unloader (S160), a visual inspection is performed on Bin 2 to determine whether it is really defective (S170), and finally, if it is defective, it is discarded.

However, if the defect in the visual inspection is due to external dust or the aforementioned edge inspection module 100, surface inspection module 200, the aforementioned phase measurement bias inspection module 300, Pt-derived ultra-fine defect inspection module 400 optical system or other errors, it is placed in Bin 1 and performs a folding or bending inspection (AGB) (S180).

The bending test (S180) checks the mechanical reliability of the ultra-thin glass applied to the flexible display by repeatedly bending the bending area of the ultra-thin glass to determine whether there is a peeling phenomenon between thin films and cracks in the thin film provided in the bending area. Its performance is tested through a bending test.

During the folding (bending) test of the ultra-thin glass, if the ultra-thin glass is broken (or cracked), it is discarded, and after passing the folding (bending) test, it is washed (S190) and packed (S200), it is shipped after attaching a protective film to the top and bottom (S210), edge inspection is performed again for Bin3 (S220), and it is configured to be vacuum-packed in tray units, wrapped in vinyl, wire-banded, box-packed, and shipped (S210).

As shown in FIG. 6, the method for inspecting ultra-fine Pt-derived defects in ultra-thin glass according to an embodiment of the present disclosure may include the step of bringing the ultra-thin glass into the inspection module (S101), and the holographic restoration device 410), scanning a first line for the dummy formed at one end of the ultra-thin glass (S102), and based on the measurement value obtained through the first line scan of the dummy, the holographic restoration device 410 predetermined scan path of the scanning device 430 and the holography restoration are determined by determining a unit area (UA) that can be captured at one time, resolution, depth, speed, and tact time of the holographic restoration device 410 (S103), determining the magnification and tact time of the objective lens 411 of the device 410 (S104), and determining the number of effective areas for the entire area of the ultra-thin glass according to a predetermined scan path of the scanning device 430 and scanning the second to Nth lines (S105), and storing partial images of the ultra-thin glass through the scanning of the second to Nth lines in the image sensor (S106) to obtain the entire ultra-thin glass. A step of restoring the shape may be included (S107).

It may include detecting a Pt-derived defect specific moiré pattern in the restored 3D glass shape using a deep learning algorithm (S108), and magnifying the Pt-derived defect special pattern to recognize a high-resolution Pt foreign material (S109).

Now, with reference to FIGS. 7A to 8B, remarkable effects of the automatic inspection system and inspection method for appearance defects of ultra-thin glass according to an embodiment of the present disclosure will be described in comparison with a comparative example.

Figure 7A:
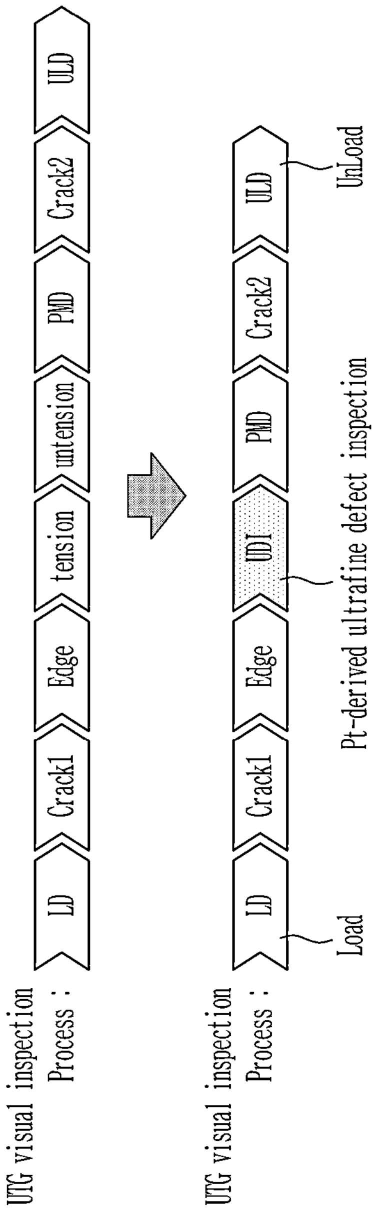

As shown in FIG. 7A, according to the automatic inspection method for defects in appearance of ultra-thin glass according to an embodiment of the present disclosure, conventionally, ultra-thin glass is loaded into an automatic inspection system for defects in appearance of ultra-thin glass, and cracks are detected by the surface inspection module 200, and using the edge inspection module 100 and the phase measurement inspection module 300, the surface state of the ultra-thin glass—for example, bubbles, foreign matter, and cracks—in order to inspect whether or not chipping has occurred, the frame must be tension-fixed to prevent bending and deformation of the central part due to its own weight. However, the edge of the ultra-thin glass can be repaired by using a method for inspecting Pt-derived ultra-fine defects of the ultra-thin glass according to an embodiment of the present disclosure (referred to as "ultra-fine defect inspection" UDI on the drawing), so there is no need to unseal after tensioning.

FIGS. 7B to 8B are diagrams illustrating the effect of an automatic inspection system and an inspection method for appearance defects of ultra-thin glass according to an embodiment of the present disclosure compared to a comparative example.

Figure 7B:
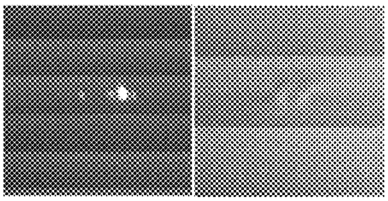
Figure 7B:
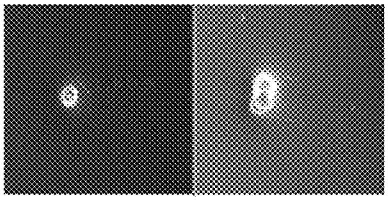

As shown in FIG. 7B, comparative example 1 shows an image of a Pt-derived foreign material taken by the surface inspection module 200, and comparative example 2 shows an image of a Pt-derived foreign material taken using an optical microscope.

Table 2 shows the result of verifying the Pt foreign material detection ability of the surface inspection module 200.

TABLE 2

Surface inspection module's ability to detect Pt contaminants

| Surface inspection Module ID | Type of Defect | Verification Quantity | Detection Quantity | Detection Rate |
|---|---|---|---|---|
| SVI #3 | Pt | 11 | 0 | 0% |

Figure 7C:
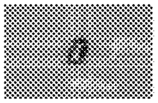
Figure 7C:
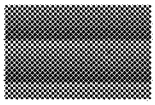
Figure 7C:
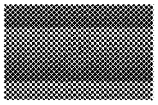
Figure 7C:
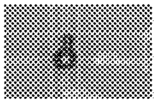
Figure 7C:
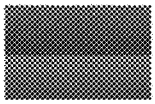
Figure 7C:
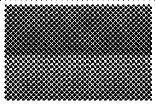
Figure 7C:
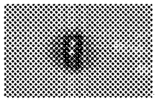
Figure 7C:
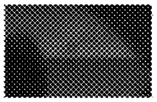
Figure 7C:
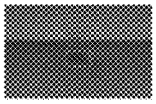
Figure 7C:
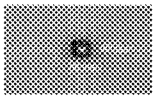
Figure 7C:
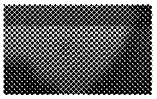
Figure 7C:
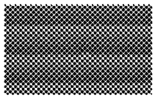
Figure 7C:
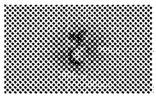
Figure 7C:
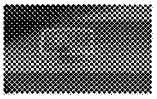
Figure 7C:
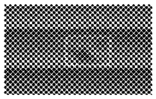

As shown in [Table 2], when the resolution of the surface inspection module 200 was 18 um, the detection quantity and detection rate were 0% as shown in the left image of FIG. 7B. However, as shown in the right side of FIG. 7B, it can be seen that the number of validations confirmed as Pt foreign matters through a microscope was 11. FIG. 7C shows the results of detecting the detection power of the conventional surface inspection module (SVI) after first and second evaluations according to the size of the Pt-derived foreign matters of ultra-thin glass verified through a microscope.

When the Pt size is unit (um) x: 3.38, y: 11.03, the 1st was not detected and the 2nd detection was a candidate, and when x: 3.60, y: 2.33, the 1st and 2nd were not detected, and x: 2.98, y: 7.88, 1st undetected, 2nd detection candidate, x: 4.50, y: 4.50, 1st undetected, 2nd detection candidate, x: 4.28, y: 4.50, 1st, 2nd detection. As a result, it can be seen that Pt-derived ultra-fine defects of 1 to 50 μm or less may be detected, but may be shipped without being detected.

Again, as can be seen through FIG. 7B, the detectable size through the surface inspection module 200 is 54 um, but as can be seen through FIG. 7C, most defects are not detected and leaked depending on the inspection environment.

As previously discussed, by applying the initial limit of Pt foreign matter of the surface inspection module 200 to 150 μm or more, designing optics, and reflecting the detection algorithm, it can be seen that there is a high possibility that most of the fine Pt foreign matter will not be detected and will mostly leak out.

Recently, the T foreign material detection limit of the surface inspection module 200 has been revised and reflected to 1 μm or more, but it can be seen that the detection condition setting for ultra-fine Pt leaks due to the optical system detection limit, as shown in Table 8a, and this is according to the Pt-derived ultra-fine defect inspection module for ultra-thin glass according to an embodiment of the present disclosure, although the pixel resolution of the holographic restoration device 410 is different depending on the lens, when it is assumed that the resolution is 1, the resolution of the surface inspection module 200 is 18.1 and, when the 2D microscope is 0.225, looking at the Pt visibility of several um, it can be seen that the surface inspection module 200 cannot recognize Pt.

The imaging method of the above surface inspection module 200 uses a combination of area lighting and line scanning, the method using the above 2D microscope utilizes line scanning, and the holographic method uses a combination of holography and line scanning.

The surface inspection module 200 requires a separate granite stage to prevent vibration even though the Pt foreign matter is not visible, and the detection ability of the internal foreign matter is poor for the depth of the ultra-thin glass, and a plurality of lights are required.

On the other hand, when using a 2D microscope, anti-vibration parts are essential, and in order to detect internal Pt contaminants in the depth of ultra-thin glass, the automatic focusing function or the limitations of its optical system are limited, and high-intensity illumination is required, so there is a problem in that vibration and data storage are weak.

When using a 2D microscope, there is a trade-off between depth and resolution, and in order to secure a wide field of view, the problem of blurred focus (defocus) occurs, which leads to an issue with the microscope optical inspection where it is impossible to clearly confirm the defect phenomena caused by the ultra-fine Pt foreign matter inside the ultra-thin glass.

Compared to this, when using the ultra-thin glass Pt-derived ultra-fine defect inspection module 400 according to an embodiment of the present disclosure, a moiré pattern, which is a unique defect characteristic, is recognized during the restoration of holography of Pt-derived ultra-fine defects, and this can be magnified to even recognize Pt nuclei.

According to an embodiment of the present disclosure, it is a non-contact measurement method rather than a direct measurement method like the Pt-derived ultra-fine defect inspection module 2D microscope of ultra-thin glass.

In particular, the Pt-derived ultra-fine defect inspection module of the ultra-thin glass according to an embodiment of the present disclosure detects the surface distortion phenomenon accompanying the ultra-fine Pt foreign material defect on the surface of the ultra-thin glass by utilizing the wide depth of field of 3D holography technology to determine the phase for each surface, it is possible to detect defects by 2D imaging the moiré phenomenon, which is a characteristic of ultra-fine Pt foreign matter defects on the surface of ultra-thin glass.

Figure 8B:
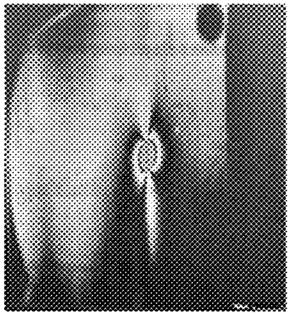
Figure 8B:
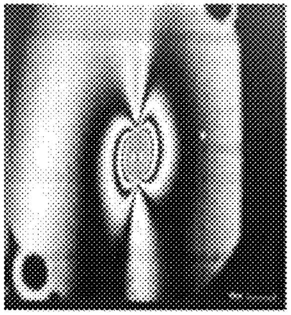
Figure 8B:
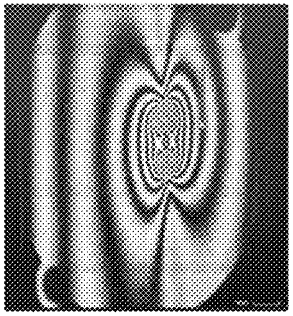
Figure 8B:
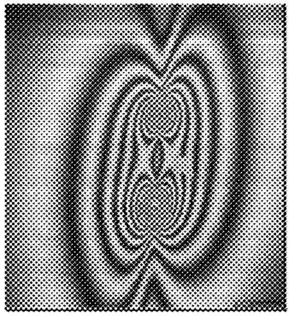

As shown in FIG. 8B, in order to detect actual defects (Real Pt) of 1 μm size with an optical system, the application of a 20× objective lens is essential, and it takes a tact time of 436.8 seconds and needs to scan more than 20 times, the field of view is about 1 mm, which reduces productivity, but the ultra-thin glass Pt-derived ultrafine defect inspection module 400 according to an embodiment of the present disclosure shows that visibility of 10 mm can be secured with a 2× objective lens due to the Moiré phenomenon, which is a characteristic of ultrafine Pt foreign matter defects, and the tact time can be reduced to 5.1 seconds, ensuring productivity.

In one embodiment of the present disclosure, the ultra-fine defect inspection module 400 derived from Pt of ultra-thin glass can apply a 2× objective lens considering the operable tact time of the holography restoration device 410, but it is possible to change the magnification according to the purpose of use. Therefore, it is desirable to equip a hybrid-type objective lens 419 that can change the objective lens considering the tact time and the purpose of use, and to control it by referring to FIG. 6 in the control device 420.

Figure 9:
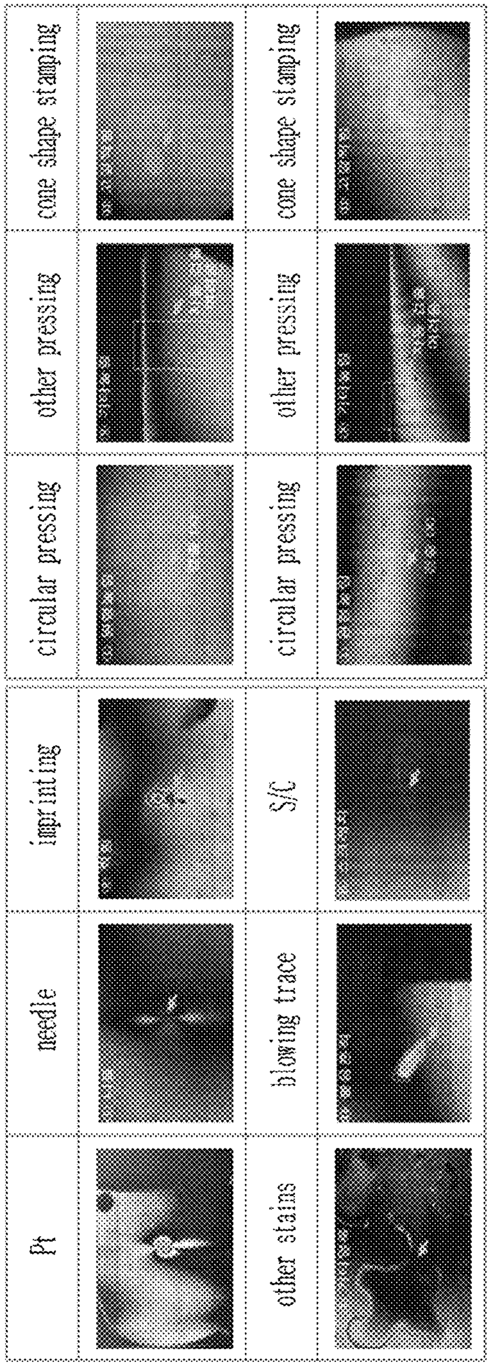
FIG. 9 is a view for examining the usability of an ultra-fine defect inspection module derived from Pt of ultra-thin glass according to an embodiment of the present disclosure.

FIG. 9 is a view for examining the usability of an ultra-fine defect inspection module derived from Pt of ultra-thin glass according to an embodiment of the present disclosure.

Referring to FIG. 9, there is a difficulty in automatic detection of dents, circular depressions, other depressions, pointed dents, stains, adhesive marks, and scratches by the ultra-fine defect inspection module 400 of ultra-thin glass according to an embodiment of the present disclosure. However, it can be seen that a unique moiré pattern is formed for ultra-fine defects derived from Pt or caused by Pt—for example, foreign substances or needles of Pt—therefore, it can distinguish between oxygen, bubble foam defects and Pt foreign substance defects (for example, crystals and precipitations from refractory materials).

When the Pt-derived ultra-fine defect inspection module 400 of the ultra-thin glass according to an embodiment of the present disclosure distinguishes between oxygen bubble defects and foreign material defects (e.g., crystal deposits from refractory materials), they affect the quality of the ultra-thin glass. Since the effect is different, the allowable size of the bubble bond or the allowable size of the Pt foreign matter is modeled by machine learning, and the allowable size of the bubble defect and the allowable size of the Pt foreign matter defect are different by the algorithm, even if the defects are the same size. Depending on the type of defect, the pass/fail criteria may be different.

In other words, if defects are simply inspected based on changes in light intensity captured by the camera of the surface inspection module (200) or phase bias module (300), it may leak ultrafine defects derived from Pt, and may also over-detect acceptable bubble foam defects, however, such over-detection could also lead to the problem of discarding ultra-thin glass produced through a difficult and complicated process.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. An automatic inspection system for detecting defects in ultra-thin glass, comprising:
- an edge inspection module that inspects for chipping and wedge defects caused during laser cutting of ultra-thin glass into cell units;
- a surface inspection module for inspecting scratches, cracks, and foreign substances on a surface of the ultra-thin glass;
- a phase measurement beam deflection (PMD) module for inspecting the surface of the ultra-thin glass for stains and depressions through phase change measurement; and
- a Pt-derived ultra-fine defect inspection module for inspecting the ultra-thin glass for Pt-derived ultra-fine defects.

2. The automatic inspection system of claim 1, wherein:
- the Pt-derived ultra-fine defects have a size of 1 to 50 μm,
- the Pt-derived ultra-fine defect inspection module inspects by using defect-specific characteristics of moiré patterns.

3. The automatic inspection system of claim 1, wherein:
- the Pt-derived ultra-fine defect inspection module includes a holographic restoration device, a scanning device that moves the holographic restoration device along a predetermined scan path, and an ultra-fine defect determination device that determines the Pt-derived ultra-fine defects using unique moiré pattern of an image obtained from the holographic restoration device.

4. The automatic inspection system of claim 3, wherein:
- the holographic restoration device includes a laser, a beam splitter, an image sensor, and a 3-dimensional shape restoration unit,
- in operation, the laser generates a laser beam, the beam splitter splits the laser beam into two beams, the image sensor records interference patterns from the ultra-thin glass caused by the two beams illuminating the ultra-thin glass, and the 3-dimensional shape restoration unit digitally restores a 3-dimensional shape of the ultra-thin glass from the interference patterns recorded by the image sensor.

5. The automatic inspection system of claim 3, wherein:
- the size of the unit area that the holographic restoration device can measure with one shot is 10 (±5 mm) mm×160 mm,
- in operation, the scanning device scans the holographic restoration device in a first scan of y mm once, moves the holographic restoration device by a first step of x mm, scans the holographic restoration device in a second scan of −y mm, moves the holographic restoration device by a second step of x mm, and repeats the first scan, the first step, the second scan, and the second step in a zigzag pattern across the surface of the ultra-thin glass.

6. The automatic inspection system of claim 5, wherein:
- the Pt-derived ultrafine defect inspection module includes a control device that determines the magnification of a hybrid objective lens for a second unit area, the speed of the scanning device, and the effective number of scans and paths, after photographing along a single scan path of the ultra-thin glass according to the first unit area,
- the control device controls the magnification of the hybrid objective lens to be a low magnification of 2×, and the scanning device has a scanning speed of 2 to 5 seconds per scan and a field of view (FOV) of 10 mm when scanning a 10 mm area of the ultra-thin glass, and
- the control device collects the unique moiré pattern, and expands the unique moiré pattern to recognize Pt in the Pt-derived ultra-fine defects.

7. The automatic inspection system of claim 3, wherein:
- the ultra-fine defect determination device includes an image acquisition unit, an image storage device, a Pt-derived ultra-fine defect determination unit, and a machine learning unit,
- in operation, the image acquisition unit acquires moiré intrinsic characteristic images and stores them in the image storage device, the Pt-derived ultra-fine defect determination unit determines the Pt-derived ultra-fine defects are present based on a comparison of moiré intrinsic characteristic images to known moiré patterns of the Pt-derived ultra-fine defects, the machine learning unit that learns adds to the known moiré patterns of the Pt-derived ultra-fine defects based on the comparison.

8. The automatic inspection system of claim 7, wherein:
- the Pt-derived ultra-fine defect determination unit includes a Pt-derived ultra-fine defect type determination model for determining types of bubble defects and Pt foreign material defects as first unique patterns, and determining sizes of the bubble defects and Pt foreign material defects as second unique patterns.

9. An automatic detecting module for detecting ultra-fine defects in ultra-thin glass, comprising:
- a holographic restoration device, a scanning device that moves the holographic restoration device along a predetermined scan path, and an ultra-fine defect determination device that determines Pt-derived ultra-fine defects using a unique moiré pattern of an image obtained from the holographic restoration device.

10. The module of claim 9, comprising:

the holographic restoration apparatus includes a laser, a beam splitter that splits the light generated by the laser into two beams, a reference beam split by the beam splitter, and an interference shape of reflected light reflected from the ultra-thin glass, an image sensor for recording interference fringes as digital images and a 3-dimensional shape restoration unit for restoring the 3-dimensional shape of the ultra-thin glass from the recorded interference fringes.

11. The module of claim 9, wherein:

the size of the unit area that the holographic restoration device can measure with one shot is 10 (±5 mm) mm×160 mm, in the scanning device, after the holographic restoration device scans ymm once, moves by xmm along one end surface of the ultra-thin glass, scans −ymm once again, and repeats a zigzag pattern by xmm along the opposite end surface of the ultra-thin glass.

12. The module of claim 11, wherein:

the Pt-derived ultra-fine defect inspection module includes a control device that determines the magnification of the hybrid objective lens for the second unit area, the speed of the scanning device, the number of effective scans, and paths, the control device controls the magnification of the hybrid objective lens to be a low magnification of 2×, and the scanning device has a scanning speed of 2 to 5 seconds per scan and a field of view (FOV) of 10 mm when scanning a 10 mm area of the ultra-thin glass, the control device collects the unique moiré pattern and expands the unique moiré pattern to recognize Pt in the Pt-derived ultra-fine defect.

13. The module of claim 11, wherein:

the ultra-fine defect determination device includes an image acquisition unit that acquires a Pt-derived ultra-micro defect moiré intrinsic characteristic image captured on the ultra-thin glass and stores it in an image storage device, and the captured image obtained from the image acquisition unit is a Pt-derived ultra-fine determination unit for determining the presence or absence of the Pt-derived ultra-fine defect based on the inference result output from the Pt-derived ultra-fine defect determination model by inputting the input to the determination model, an automatic detection module for Pt-derived ultra-fine defects in ultra-thin glass including a machine learning unit that learns the unique characteristics of the moiré pattern of defects.

14. The module of claim 13, wherein:

the Pt-derived ultra-fine defect determination unit includes a Pt-derived ultra-fine defect type determination model for determining the types of bubble defects and Pt foreign material defects as a unique pattern, and a size for determining the size of the bubble defects and Pt foreign material defects as a unique pattern, and an automatic detection module for Pt-derived ultra-fine defects of ultra-thin glass includes a judgment model.

15. A method of automatically inspecting ultra-fine glass for Pt-derived ultra-fine defects, comprising:

inspecting a predetermined surface area of the ultra-thin glass for scratches, foreign matter, dents, and stains when the cassette is loaded into the automatic inspection system for poor appearance of the ultra-thin glass in units of cells;

performing a Pt-derived ultra-fine defect inspection on the ultra-thin glass using a holographic restoration device and a scanning device that moves the holographic restoration device along a predetermined scan path;

performing edge defect detection for detecting edge defects on the ultra-thin glass on a cell-by-cell basis or inspecting surface stains or depressions of the ultra-thin glass through phase change measurement; and inspecting the ultra-thin glass by bending or folding the ultra-thin glass in units of cells.

16. The method of claim 15, wherein:

the edge inspection, the surface appearance defect inspection, and the phase change measurement inspection are automatic inspection methods for appearance defects of the ultra-thin glass that do not include tensile and non-tensile ultra-thin glass for detecting the Pt-derived ultra-fine defects.

17. The method of claim 15, wherein:

in the edge inspection, the surface appearance defect inspection, and the phase change measurement inspection, automatic review is performed even when there is a wedge, chipping, pressing, or protrusion, and the visual inspection is performed when the ultra-thin glass is unloaded from the appearance defect automatic inspection system.

18. A method of inspecting ultra-thin glass for Pt-derived ultra-fine defects, comprising:

bringing the ultra-thin glass into the inspection module;

scanning a first line with respect to a dummy formed at one end of the ultra-thin glass with a holographic restoration device;

determining a unit area (UA) that can be photographed at one time by the holographic restoration device and resolution, depth, speed, and tact time of the holographic restoration device based on a measurement value obtained through a first line scan of the dummy;

determining and controlling a predetermined scan path of the scanning device, an objective lens magnification and a tact time of the holographic restoration device;

determining the number of effective areas for the entire area of the ultra-thin glass according to a predetermined scanning path of the scanning device and scanning the second to Nth lines;

restoring the shape of the entire ultra-thin glass by storing partial images of the ultra-thin glass through scanning of the second to Nth lines in the image sensor;

determining a 2D Pt-derived defect-specific moiré pattern image on the restored 3D glass shape using a deep learning algorithm; and recognizing the nucleus of the Pt foreign material by magnifying the unique pattern of the Pt-derived defect.

19. A method of inspecting ultra-thin glass for Pt-derived ultra-fine defects comprising:

2D imaging of a moiré phenomenon, which is a characteristic of ultra-fine Pt foreign material defects on the surface of ultra-thin glass, by using a wide depth of 3D holographic technology to determine a surface distortion accompanying ultra-fine Pt foreign material defects on a surface of ultra-thin glass.

20. The method of claim 19, further comprising:

securing visibility of 10 mm at a low magnification of 2× objective lens, and mass productivity with a tact time of 2 to 5 seconds;

acquiring a Pt-derived ultra-fine defect moiré characteristic image captured from the ultra-thin glass, inputting the Pt-derived ultra-fine defect moiré characteristic image into a Pt-derived ultra-fine defect determination model, based on presence or absence of the Pt-derived ultra-fine defects;

using a machine learning algorithm to learn the unique characteristics of the moiré pattern of the Pt-derived ultra-fine defects of the ultra-thin glass;

determining types of bubble defects and Pt foreign material defects as moiré-specific patterns; and determining sizes of the bubble defects and the Pt foreign material defects among the Pt-derived ultra-fine defects as moiré-specific.

* * * * *